United States Patent
Cole

(10) Patent No.: US 6,487,241 B1
(45) Date of Patent: Nov. 26, 2002

(54) METHOD AND APPARATUS EMPLOYING CUTBACK PROBE

(75) Inventor: Terry L. Cole, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/488,603

(22) Filed: Jan. 20, 2000

Related U.S. Application Data

(60) Provisional application No. 60/166,935, filed on Nov. 22, 1999.

(51) Int. Cl.[7] .................................................. H04B 1/38
(52) U.S. Cl. ....................................... 375/220; 375/222
(58) Field of Search ................................. 375/220, 222, 375/219; 370/278, 282, 318; 455/73, 13.4, 557, 571; 725/124

(56) References Cited

U.S. PATENT DOCUMENTS

| | | | | |
|---|---|---|---|---|
| 4,777,653 A | | 10/1988 | Bonnerot et al. .............. 455/69 |
| 5,241,565 A | | 8/1993 | Kloc et al. ..................... 375/58 |
| 5,551,057 A | * | 8/1996 | Mitra .......................... 370/328 |
| 5,634,195 A | * | 5/1997 | Sawyer ........................ 370/252 |
| 6,047,015 A | * | 4/2000 | Watanabe et al. ........... 375/132 |
| 6,081,564 A | * | 6/2000 | Han ............................. 370/320 |
| 6,111,936 A | * | 8/2000 | Bremer ......................... 379/28 |
| 6,154,524 A | * | 11/2000 | Bremer ......................... 379/27 |
| 6,188,678 B1 | * | 2/2001 | Prescott ...................... 370/318 |
| 6,226,334 B1 | * | 5/2001 | Olafsson ..................... 375/222 |
| 6,236,714 B1 | * | 5/2001 | Zheng et al. .................. 379/6 |
| 6,301,514 B1 | * | 10/2001 | Canada et al. ............. 700/108 |
| 6,327,709 B1 | * | 12/2001 | Ovadia et al. .............. 725/124 |

FOREIGN PATENT DOCUMENTS

GB    2 300 546    11/1996    ............. H04L/1/20

* cited by examiner

*Primary Examiner*—Chi Pham
*Assistant Examiner*—Emmanuel Bayard
(74) *Attorney, Agent, or Firm*—Williams, Morgan & Amerson, P.C.

(57) ABSTRACT

A method and apparatus are provided. The method includes establishing a pathway from a first transceiver to a second transceiver, determining a power level at the second transceiver, and determining whether the power level at the second transceiver is at an acceptable level over the pathway. The method also includes adjusting a power level at the first transceiver in response to determining whether the power at the second transceiver is at the acceptable level. The apparatus includes a first and second logic. The first logic is capable of establishing a pathway with a transceiver. The second logic is capable of determining a power level at the transceiver, determining whether the power level at the transceiver is at an acceptable level over the pathway, and adjusting a power level of the apparatus in response to determining whether the power at the transceiver is at the acceptable level.

39 Claims, 5 Drawing Sheets

METHOD AND APPARATUS EMPLOYING CUTBACK PROBE

The present application claims priority from U. S. Provisional Application Ser. No. 60/166,935, filed Nov. 22, 1999; the entire contents of which is specifically incorporated herein by reference in its entirety.

BACKGROUND OF THE INVENTION

1. Field of the Invention

This invention relates generally to telecommunications devices, and, more particularly, to a method and apparatus employing a cutback probe. Specifically, the present invention relates to a method and apparatus employing a politeness and off-hook cutback probe.

2. Description of the Related Art

In communications systems, particularly telephony, it is common practice to transmit signals between a subscriber station and a central switching office via a two-wire, bi-directional communication channel. The Plain Old Telephone System (POTS), designed primarily for voice communication, provides an inadequate data transmission rate for many modem applications. To meet the demand for high-speed communications, designers have sought innovative and cost-effective solutions that take advantage of the existing network infrastructure. Several technological advancements have been proposed in the telecommunications industry that make use of the existing network of telephone wires. One of these technologies is the xDSL technology. DSL technology uses the existing network of telephone lines for broadband communications. An ordinary twisted pair equipped with DSL interfaces can transmit videos, television, and high-speed data.

DSL technologies typically leave the POTS service undisturbed. Traditional analog voice band interfaces use the same frequency band, 0–4 Kilohertz (kHz), as telephone service, thereby preventing concurrent voice and data use. A DSL interface, on the other hand, operates at frequencies above the voice channels from 100 kHz to 1.1 Megahertz (MHz). Thus, a single DSL line is capable of offering simultaneous channels for voice and data.

DSL systems use digital signal processing (DSP) to increase throughput and signal quality through common copper telephone wire. Certain DSL systems provide a downstream data transfer rate from the DSL Point-of-Presence (POP) to the subscriber location at speeds of about 1.5 Megabits per second (MBPS). The transfer rate of 1.5 MBPS, for instance, is fifty times faster than a conventional 28.8 kilobits per second (KBPS) transfer rate.

One popular version of the DSL technology is the Asymmetrical Digital Subscriber Line (ADSL) technology. The ADSL standard is described in ANSI T1.413 Issue 2, entitled, "Interface Between Networks and Customer Installation—Asymmetric Digital Subscriber Line (ADSL) Metallic Interface," the most recent revision of which as of the filing date of this specification is incorporated herein by reference in its entirety.

ADSL modems use two competing modulation schemes: discrete multi-tone (DMT) and carrierless amplitude/phase modulation (CAP). DMT is the standard adopted by the American National Standards Institute. The standard defines 256 discrete tones. Each tone represents a carrier signal that can be modulated with a digital signal for transmitting data. The specific frequency for a given tone is 4.3125 kHz times the tone number. Tones 1–7 are reserved for voice band and guard band (i.e., tone 1 is the voice band and tones 2–7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream.

ADSL modems generally employ some mechanism for regulating the power levels to reduce cross talk and non-linear effects from high signal levels. Two mechanisms of regulating power levels are politeness cutback and off-hook cutback. Politeness cutback is generally a cutback applied to prevent overload of an analog-to-digital (A/D) converter of a receiver. The A/D converter of the receiver is likely to be overloaded, for example, when the subscriber loop is short and the attenuation of the line is relatively small. The off-hook cutback is primarily utilized to provide reduction in signal level to remove non-linear elements.

Existing communications systems that employ some form of politeness cutback are generally unreliable, inefficient, and unnecessarily constrictive. Existing communications systems, for example, typically rely on open loop systems to determine politeness cutback, which means that there is no direct communication of power levels. Thus, for instance, a device may measure upstream receiver power to indirectly infer the downstream power required for transmission. This method has several shortcomings. First, such a method requires a priori power level and thereby may be unnecessarily constrictive, and perhaps inefficient. Second, such a method may be unreliable since it employs an indirect approach for determining the required downstream power. This indirect approach is especially prone to inaccuracies in instances where different wires or frequencies are utilized for upstream and downstream communications.

Prior communications systems employing a method to determine off-hook cutback also tend to be unreliable, inefficient, and unnecessarily constrictive. Such systems transmit maximum power, estimate existing distortion levels, and then determine the cutback needed to reduce the distortion to an acceptable level. This method of determining cutback, however, has several shortcomings. First, such a method virtually ensures a strong signal on the line, causing interference to other services, thereby producing the very result the off-hook cutback is intended to avoid. Second, such a method requires a priori power level and therefore may be unnecessarily constrictive, as well as inefficient.

The present invention is directed to overcoming, or at least reducing the effects of, one or more of the problems set forth above.

SUMMARY OF THE INVENTION

One aspect of the present invention is seen in a method that includes establishing a pathway from a first transceiver to a second transceiver, determining a power level at the second transceiver, and determining whether the power level at the second transceiver is at an acceptable level over the pathway. The method also includes adjusting a power level at the first transceiver in response to determining whether the power at the second transceiver is at the acceptable level.

Another aspect of the present invention is seen in an apparatus that includes a first and second logic. The first logic is capable of establishing a pathway with a transceiver. The second logic is capable of determining a power level at the transceiver, determining whether the power level at the transceiver is at an acceptable level over the pathway, and adjusting a power level of the apparatus in response to determining whether the power at the transceiver is at the acceptable level.

BRIEF DESCRIPTION OF THE DRAWINGS

The invention may be understood by reference to the following description taken in conjunction with the accompanying drawings, in which like reference numerals identify like elements, and in which.

Figure 1:
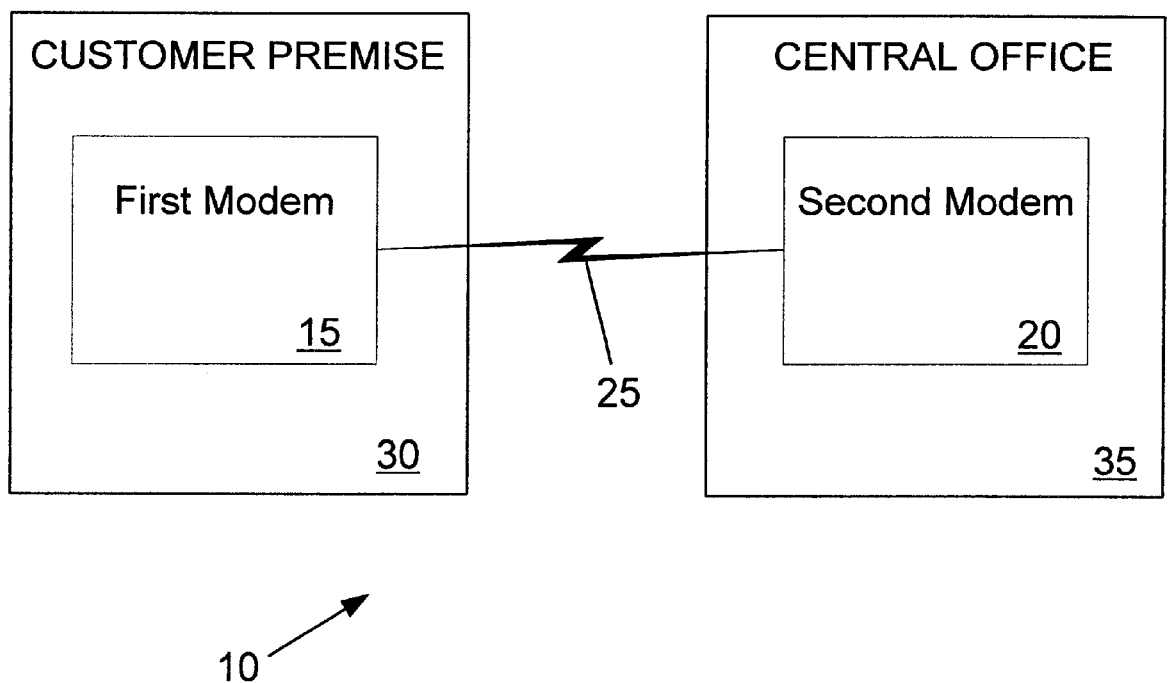
FIG. 1 is a simplified block diagram of a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a communications system 10 is provided. The communications system 10 includes a first modem 15 coupled to a second modem 20 through a connection 25. In the illustrated embodiment, the first modem 15 is located at a customer premise 30, and the second modem 20 is part of a central office 35. The connection 25 is an ordinary twisted pair connection, as is common in present-day telephone networks. However, other connection types (e.g., wireless, cellular, etc.) are contemplated, depending on the specific implementation. Also, it is contemplated that the second modem 20 may not be part of the central office 35, but rather the second modem 20 may be installed in a second customer premise (not shown). For purposes of illustration, the modems 15, 20 are described as they might be implemented under the ADSL protocol (ANSI T1.413). It is contemplated that the techniques described herein may be applied to other communication protocols, depending on the specific implementation. The functions described herein may also be implemented in other communications devices other than modems.

The second modem 20 in one embodiment may be a gateway to a larger communications network (not shown), such as a local or wide area network, or the Internet. Typically, the first modem 15 establishes a connection to the communications network (not shown) through the second modem 20. During the process of establishing the connection, the first and second modems 15 and 20 complete a training process whereby an initial bit loading technique (e.g., water filling, equal energy distribution, etc.) is employed to establish the throughput available for communication between the modems 15, 20.

Although the present invention is described as it may be implemented in a modem, it is contemplated that, in light of this disclosure, the invention may be applied to any type of transceiver, including, but not limited to, a modem or some other wired or wireless communication device.

Figure 2:
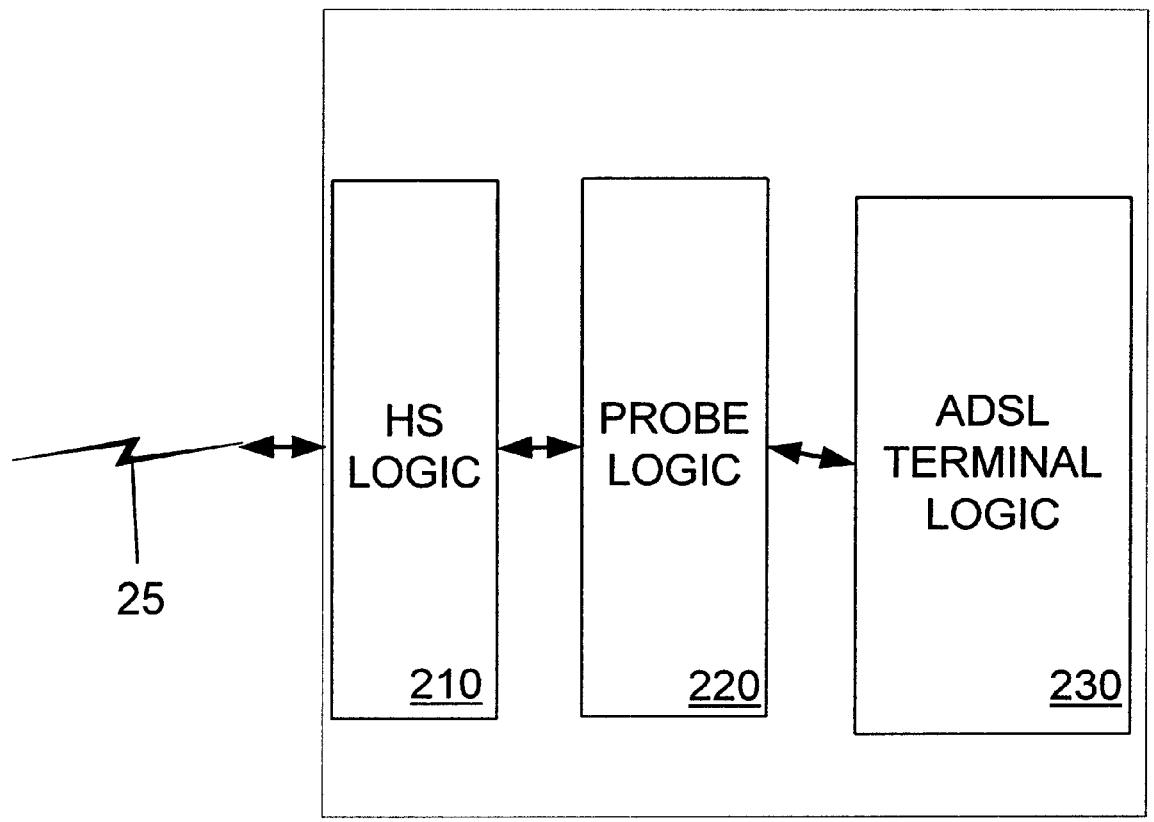
FIG. 2 is a simplified block diagram of a modem in the communications system of FIG. 1.
Figure 3:
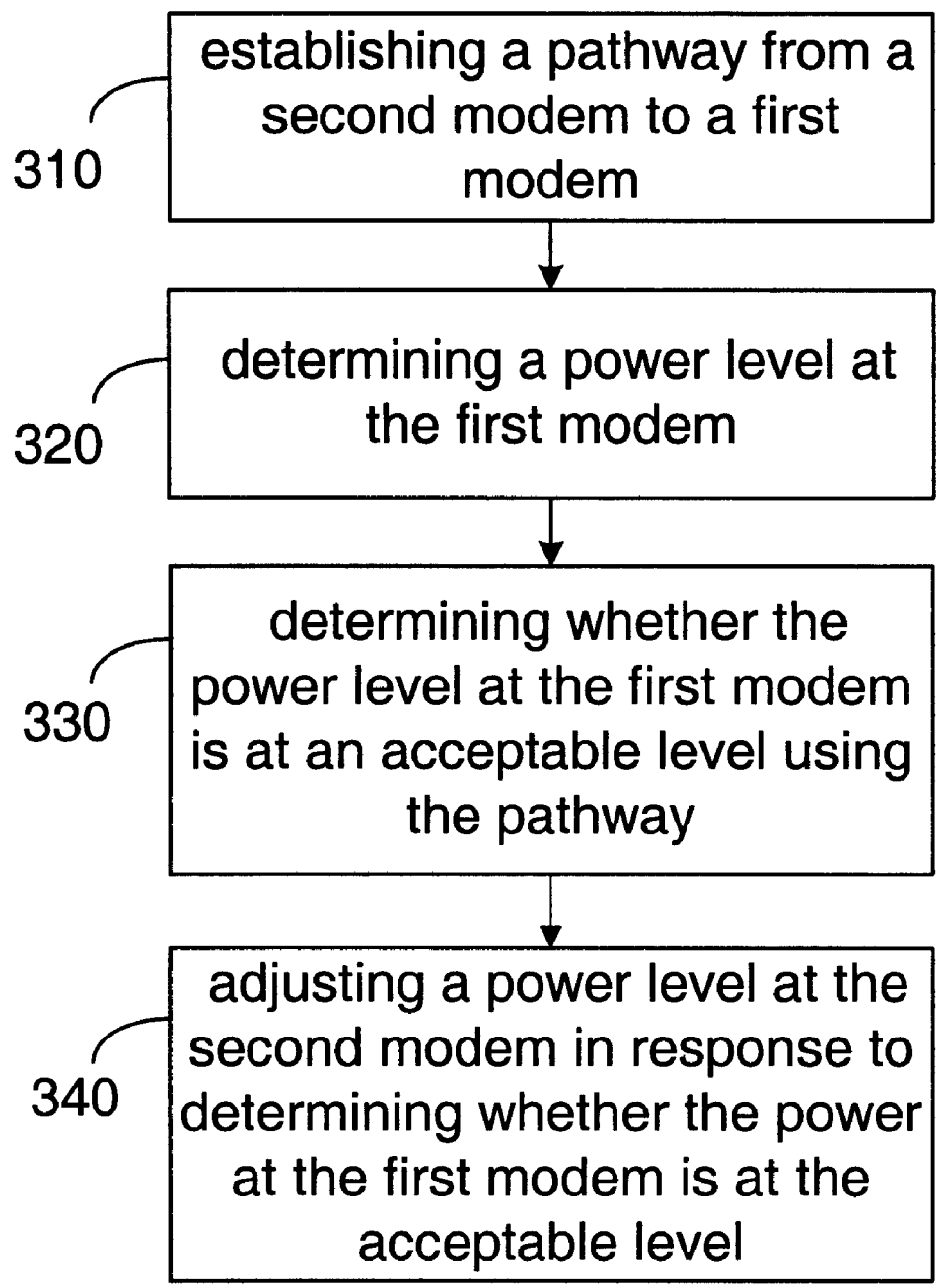
FIG. 3 is a flow diagram of a method in accordance with the present invention that may be employed by the modem of FIG. 2.

Referring to FIGS. 2 and 3, a simplified block diagram of one embodiment of a modem 100 and a method 305 in accordance with the present invention are provided. For the sake of clarity, and to further an understanding of the invention, the method 305 shall be disclosed in the context of the modem 100. However, the invention is not so limited and admits wide variation as is discussed further below.

The modem 100 may be the first modem 15 or the second modem 20, although for illustrative purposes it is assumed that the modem 100 is the second modem 20 located at the central office 35. For clarity and ease of illustration, not all functional blocks are illustrated in detail because these items are known to those of ordinary skill in the art, and are further defined in well-known modem standards.

The modem 100 includes handshake logic 210, probe logic 220, and ADSL terminal logic 230. Although not so limited, the handshake logic 210 in the illustrated embodiment comprises the handshake procedures defined for DSL transceivers, as described in ITU-T Recommendation G.994.1, entitled, "Handshake Procedures for Digital Subscriber Line Transceivers" (hereinafter referred to as the "Handshake Recommendation"). The most recent revision of the Handshake Recommendation as of the filing date of this specification is incorporated herein by reference in its entirety. The Handshake Recommendation defines the signals, messages, and procedures for common start-up procedures for the modem 100.

The handshake logic 210 and probe logic 220 each include a modulator (not shown) for modulating all transmitted signals and demodulator (not shown) for demodulating all received signals. The handshake logic 210, in accordance with the Handshake Recommendation, sends all messages with one or more carrier sets. All carrier frequencies within a carrier set and all carrier sets are simultaneously modulated with the same data bits using Differentially encoded binary Phase Shift Keying (DPSK). A transmit point is rotated 180 degrees from the previous point if a transmit bit is a 1, and the transmit point is rotated 0 degrees from a previous point if the transmit bit is a 0.

Figure 4:
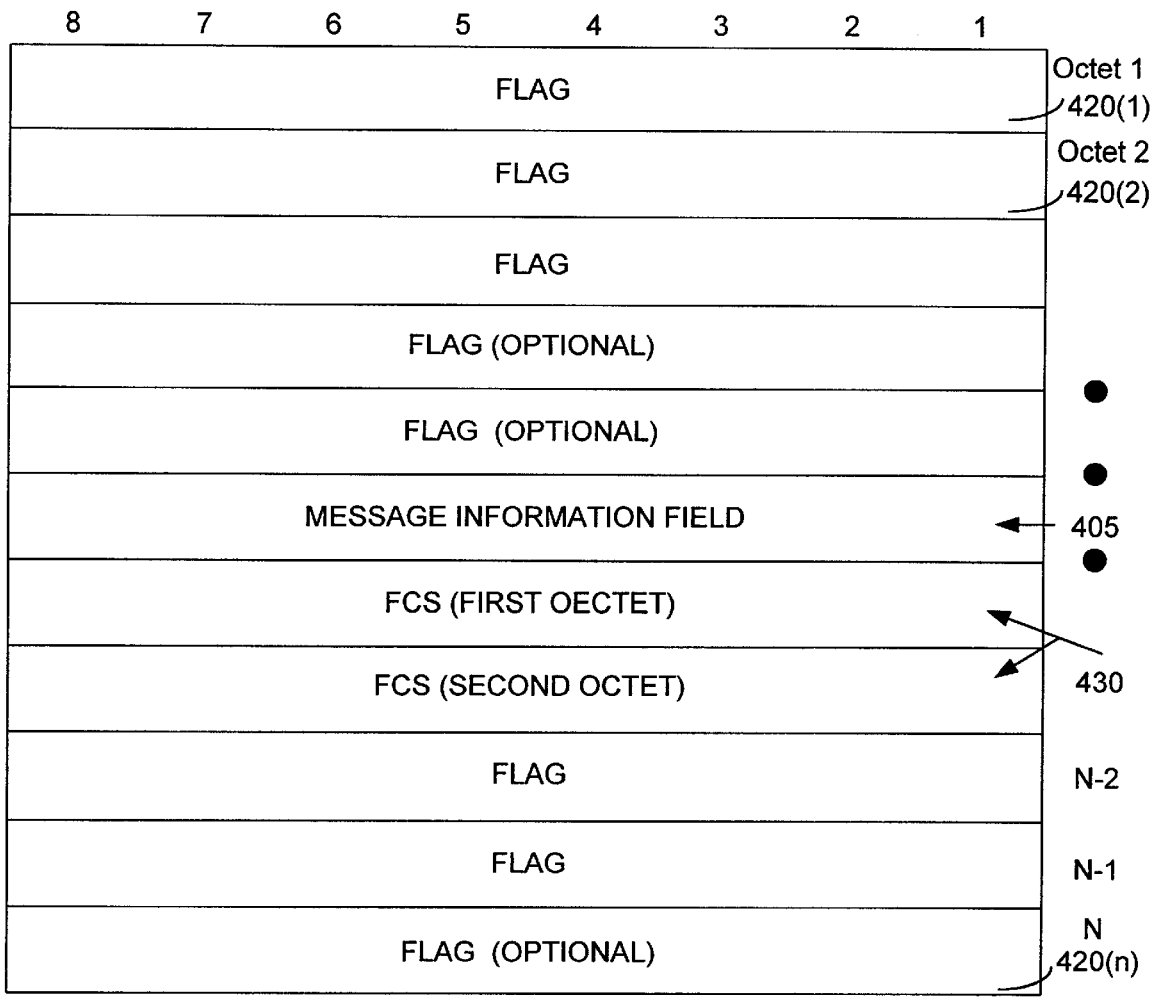
FIG. 4 illustrates a format of a frame that may be utilized in the communications system of FIG. 1 to transmit messages.

The handshake logic 210 supports messaging between the modem 100 and first modem 15. A message, defined herein as framed information conveyed via modulated transmission, consists of one or more segments. Each segment is encapsulated in an information field 405 of a frame 410, as shown in FIG. 4. FIG. 4 illustrates a structure of the frame 410. The bits are grouped into octets 420(1–n), where the bits of each octet 420(1–n) are shown horizontally and are numbered from 1 to 8. The octets 420(1–n) are displayed vertically and are numbered from 1 to N. The contents of the frame 410 shall consist of an integer number of octets 420(1–n). The octets 420(1–n) are transmitted in ascending numerical order. Within an octet 420(1–n), bit 1 is the first bit to be transmitted.

As shown in FIG. 4, each frame 410 begins and ends with a standard HDLC flag octet (01111110). At least three, but not more than five, flags shall be sent to begin the frame 410. At least two, but not more than three, flags shall follow the frame check sequence (FCS) field 430 of each frame 410. The handshake logic 210 supports error checking via the frame check sequence field 430. The FCS field 430 is 16 bits (2 octets) in length. The Handshake Recommendation describes in more detail an error-checking algorithm that may be employed in the instant invention.

Figure 5:
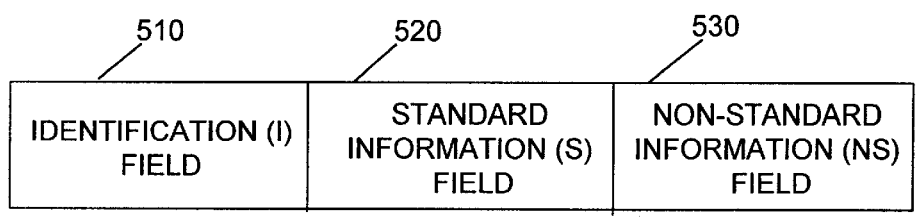
FIG. 5 illustrates a format of an information field of the frame FIG. 4.
Figure 6:
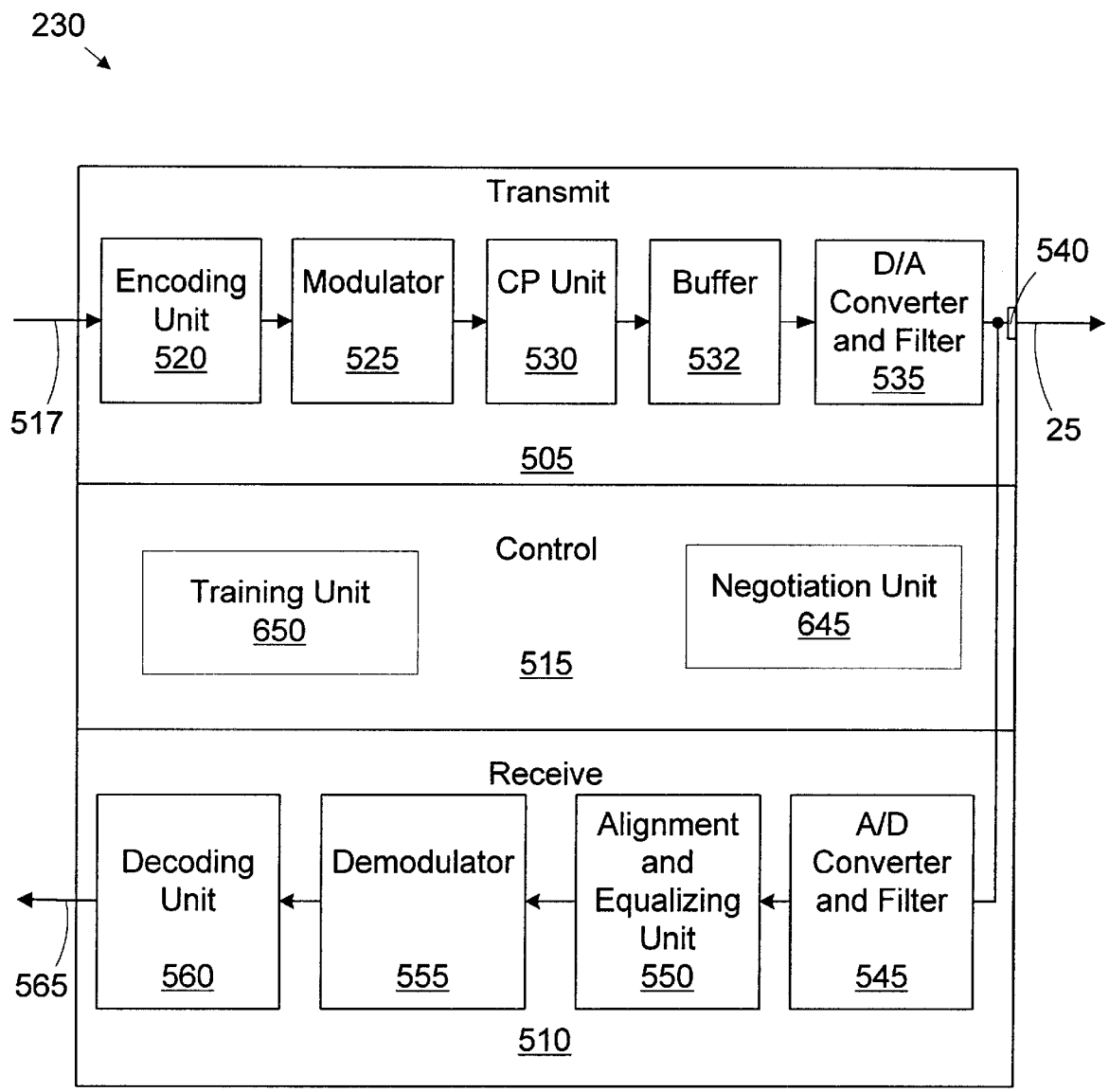
FIG. 6 illustrates an ADSL terminal logic 230 that may be employed in the modem of FIG. 2.

As per the Handshake Recommendation, the message information field 405 consists of three components, an identification field 510, a standard information field 520, and an optional non-standard information field 530, as shown in FIG. 5. The identification field 510 consists of four components: a message type field, a revision number field, a vender ID field, and a bit-encoded parameter field. The purpose of the message type field is to identify the message type of the frame 410, for example, message type mode select (MS) is represented by bit numbers 00000000. The purpose of the revision number field is to identify the revision number of the Handshake Recommendation to which the modem 100 conforms. The Vender ID field identifies the vendor of the modem 100. The bit-encoded parameter field contains parameters that are independent of the mode to be selected and are typically either service or application related. The standard information field 520 is utilized to convey information defined within the Handshake Recommendation, while the non-standard information field 530 is utilized to convey information beyond that defined in the Handshake Recommendation. Generally, in the standard information field 520, the parameters represent modes of working or capabilities relating to the first modem 15 and the modem 100.

The Handshake Recommendation includes a protocol for supporting two types of transactions—basic and extended transactions. Basic transactions, which are pre-defined transactions that are initiated by the first modem 15, may be classified as one of two types: (1) transactions that exchange and negotiate capabilities between the modem 100 and first modem 15; and (2) transactions that select a mode of operation. Examples of basic transactions are "transaction A" and "transaction B." In transaction A, the first modem 15 selects a mode of operation and requests the modem 100 transition to the selected mode. When the modem 100 responds with an acknowledgment message, both modems 15, 100 transition to the selected mode. In transaction B, the first modem 15 requests that the modem 100 select the mode of operation. The modem 100 selects the mode by transmitting an MS message. When the first modem 15 responds with an acknowledgment message, both modems 15, 100 transition to the selected mode.

Extended transactions are generally utilized when the modem 100 wishes to control the negotiation procedures. Extended transactions are derived from a concatenation of two basic transactions. An example of an extended transaction is "transaction A:B," in which the first modem 15 selects a mode of operation and requests that the modem 100 transition to the selected mode. However, rather than responding to the MS message with an ACK(1) message as is the case for basic transaction A, the modem 100 responds to the MS message with a REQ-MR message requesting the first modem 15 to proceed directly into basic transaction B.

The method 305 of FIG. 3 may be employed by the modem 100 to establish the politeness cutback level. The method 305 begins at block 310, where the handshake logic 210, in conjunction with the probe logic 220, establishes a communication pathway with the first modem 15 via the connection 25. The communication pathway may include error detection capability and error correction capability for a more reliable connection. In one embodiment the error checking algorithm described in the Handshake Recommendation may be employed in the instant invention. Although the Handshake Recommendation describes no error correction algorithm, such a feature can be readily integrated with the described error-checking algorithm. Error correction may be through simple error detection through the cyclic redundancy checking and then a negative acknowledgement followed by retransmit. Another implementation may include Reed-Solomon coding of the message contents prior to including both the message and the Reed-Solomon code into the message field 405. Error correction may allow a certain amount of errors to be corrected without requiring a retransmission.

In one embodiment, the communication pathway is established using the smallest amount of power acceptable, which may be established through a variety of methods. In this instance, "acceptable" power refers to a power level that is adequate for establishing a reliable communication pathway with the first modem 15. One method for establishing the communication pathway using the smallest amount of power acceptable is based on priori estimates, where one or more previously stored power levels could be utilized to ascertain the minimum power required. That is, the modem 100 initiates communication with the first modem 15 using a power level that was utilized during an earlier connection. Alternatively, the minimum acceptable power may be determined by iteratively increasing the power until the communication pathway is established. In one embodiment, the probe logic 220 initiates a transaction with the first modem 15 to determine the minimum acceptable power. That is, the modem 100 may send a message to the first modem 15 at a first selected power level, and then wait for an acknowledgment from the first modem 15 to verify that the message successfully reached its destination. A bad or no acknowledgment indicates that a higher power level is needed. The power level at the modem 100 of the signal is increased iteratively until an affirmative acknowledgment is received from the first modem 15. The transaction initiated to determine minimum acceptable power in one embodiment may be an extended transaction since it is initiated by the modem 100 located at the central office 35.

At block 320, the probe logic 220 using the communication pathway determines a power level at the first modem 15, where the power level may be the actual power transmitted by the first modem 15. That is, the power level at the first modem 15 may be encoded reliably and sent over the communication pathway in response to a request from the modem 100. In one embodiment, a request for the power level at the first modem 15 may be sent in the form of a message in the frame 410, in accordance with the protocol defined in the Handshake Recommendation. The information between the two modems 15, 100 may be exchanged in the standard information field 520 of the frame 410 if such a message were defined as part of the Handshake Recommendation; if not, it may be transmitted in the non-standard information field 530.

At block 330, the probe logic 220 of the modem 100 determines whether the power level at the first modem 15 is at an acceptable level using the pathway. That is, based on the power at the first modem 15, the modem 100 is capable of determining the actual attenuation of the signal on the connection 25. If the attenuation is small, partly because the two modems 15, 100 are in close proximity to each other, then, at block 340, the probe logic 220 of the modem 100 adjusts a power level at the modem 100 in response to the acknowledgment from the first modem 15. The power level at the first modem 15 is adjusted to establish the desired politeness cutback level.

The method 305 of FIG. 3 may also be employed by the modem 100 to establish the off-hook cutback level. At the block 310, the handshake logic 210, in conjunction with the probe logic 220, establishes a communication pathway with the first modem 15 via the connection 25. The communication pathway may include error detection capability and error correction capability. In one embodiment, the communication pathway is again established using the smallest amount of power acceptable, using a similar method as that described earlier. Once the communication pathway is established, the power at the modem 100 is gradually increased to ascertain the off-hook cutback level, as described in more detail below.

At the block 320, the probe logic 220 using the communication pathway determines a power level at the first modem 15. That is, the power level at the first modem 15 is analyzed for distortion. In one embodiment, a request for ascertaining the power level at the first modem 15 may be sent over in the form of a message in the frame 410, in accordance with the protocol defined in the Handshake Recommendation. The information between the two modems 15, 100 may be exchanged in the standard information field 520 of the frame 410 if such a message were defined as part of the Handshake Recommendation; if not, it may be transmitted in the non-standard information field 530.

At the block 330, the probe logic 220 determines whether the power level at the first modem 15 is at an acceptable level using the pathway, wherein "acceptable" power level may be a maximum power level without distortion. That is, the first modem 15 analyzes the power level for distortion. If the distortion is within an acceptable range, then, at the block 340, the probe logic 220 adjusts a power level at the modem 100 by increasing the power level of the modem 100. The power level at the modem 100 is increased until the distortion at the first modem 15 reaches the highest acceptable level. The probe logic 220 may determine the highest acceptable power level at the first modem 15 in a variety of ways, including, but not limited to, simple stepping search, binary search, or a logarithmic search.

In a stepping search, the power may be linearly increased until the power level at the first modem 15 reaches the highest acceptable level. In a binary search, the power may be started at a preselected level, and then adjusted up or down by a selected factor, depending on whether the distortion at the first modem 15 is within an acceptable level. For example, if the power is not within the acceptable levels at the first modem 15, the preselected level may be reduced by half, assuming the selected factor is two. Conversely, the preselected level may be increased by the selected factor to achieve the highest acceptable power level. If the power must be further reduced or increased, it may be continually reduced or increased by the selected factor until the desired off-hook cutback level is achieved. In a logarithmic search, the highest acceptable power level may be ascertained by increasing or decreasing the power in a logarithmic manner.

Once the politeness cutback and off-hook cutback levels are established, the ADSL terminal logic 230 initiates a training procedure with the first modem 15 and proceeds to exchange data. The ADSL terminal logic 230 includes transmit, receive, and control functional blocks 505, 510, 515, as shown in FIG. 5. The transmit block 505 includes an encoding unit 520 adapted to receive outgoing digital data over a data-out line 517. The encoding unit 520 performs functions such as cyclic redundancy checking (CRC), scrambling, forward error correction, and interleaving. As stated above, these functions are known to those of ordinary skill in the art.

The data in binary form is grouped into sets referred to as frames. A plurality of frames (i.e., 68 in the illustrated embodiment) is referred to as a superframe. The transmit block 505 also includes a modulator 525 that receives the data frames from the encoding unit 520 and modulates a carrier or carriers with the data. The modulator 525 performs tone ordering, constellation encoding, gain scaling, and an inverse discrete Fourier transform (IDFT) function to provide time domain waveform samples. The set of time domain waveform samples corresponding to a frame of data is referred to as a symbol. A cyclic prefix (CP) unit 530 performs cyclic prefix insertion (i.e., a subset of the output samples from the modulator 525 is replicated and prepended to the existing output samples to provide an overlap and allow for better symbol alignment). A buffer 532 stores the samples received from the CP unit 530. A digital to analog (D/A) converter and filter 535 converts the samples from the CP unit 530 to an analog waveform suitable for transmission over the connection 25 through an external line interface 540.

The receive block 510 includes an analog to digital (A/D) converter and filter 545 that receives an analog waveform over the connection 25 and samples the analog waveform to generate a time domain digital signal. An alignment and equalizing unit 550 performs functions known in the art, such as symbol alignment and time domain equalization. In time domain equalization, because the tones are at different frequencies, certain frequencies travel faster than others, and as such, all the tones do not arrive at the same time. The time domain equalization function of the alignment and equalizing unit 550 delays the faster tones to compensate for the propagation speed differences. There is a performance trade-off between the symbol alignment and time domain equalization functions in that a higher degree of symbol alignment accuracy allows a lesser degree of accuracy in time domain equalization. Cyclic prefix insertion improves symbol alignment accuracy. The alignment and equalizing unit 550 also performs gain control to increase the amplitude of the received signal.

A demodulator 555 receives the time domain samples from the alignment and equalizing unit 550 and converts the time domain data to frequency domain data. The demodulator 555 performs a slicing function to determine constellation points from the constellation encoded data, a demapping function to map the identified constellation points back to bits, and a decoding function (e.g., Viterbi decoding if trellis constellation coding is employed). In the case where the modem operates using the ADSL protocol, the demodulator 555 also performs tone deordering to reassemble the bytes that were divided among the available tones. A decoding unit 560 in the receive block 510 performs forward error correction, CRC checking, and descrambling functions on the data received from the demodulator 555. The reconstructed data provided by the decoding unit 560 represents the sequential binary data that was sent by the first modem 15, the interfacing modem. The reconstructed data is provided to a data-in line 565.

In the control block 515, a negotiation unit 645 identifies the greatest common tone set supportable by the modem 100 and the first modem 15 to which the modem 100 is connected. The upstream and downstream tone sets of the modem 100 are intersected with the corresponding upstream and downstream tone sets for the first modem 15 to determine the greatest common tone set. A training unit 650 trains the supported tones to identify those free of impairments. The negotiation unit 645 and training unit 650 configure the other elements in the transmit and receive blocks 505, 510; however, for clarity, all physical connections between these elements are not shown. After training, the ADSL terminal logic 230 proceeds to exchange data with the first modem 15.

Although FIG. 2 illustrates probe logic 220 as a separate block, it is envisioned that the functionality of the probe logic 220 may be integrated as part of the handshake logic 210, or, alternatively, as part of the ADSL terminal logic 230, without deviating from the spirit and scope of the present invention. Moreover, in one embodiment, the ADSL terminal logic 230 controls (i.e., initiates/terminates) the functions performed by the probe and handshake logic 210. That is, during startup, the ADSL terminal logic 230 first calls the handshake logic 210 and probe logic 220 to determine the politeness cutback level and/or the off-hook cutback level, and then proceeds to exchange data with the first modem 15.

The present invention offers several advantages in that it offers an efficient, effective, and reliable means for controlling power levels to reduce cross talk and non-linear effects from high signal levels. The instant invention offers the method 305 and modem 100 to systematically adjust the appropriate power levels to a desired, optimal level, as opposed to the unreliable, inefficient, ineffective, and unnecessarily constrictive means employed by existing systems. Another advantage offered by the present invention is that the politeness and off-hook cutbacks may be determined substantially simultaneously, which may be beneficial for a variety of reasons. For example, it is possible for the modem 100 to operate at a politeness cutback level that may be higher than the off-hook cutback level. In such an instance, where the modem 100 is operating at a power level higher than the off-hook cutback level, the non-linear effects may adversely affect the performance of the first modem 15 (i.e., the peer modem) or the performance of any other modems (not shown) that use adjacent subscriber lines. However, if both the politeness and off-hook cutback are known in advance, as is possible using the instant invention, the modem 100 can operate at an optimal power level that satisfies both of the cutback levels. In one embodiment, the modem 100 operates at a power level that is the lesser of the two cutback levels.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

establishing a pathway from a first transceiver to a second transceiver;

determining a power level at the second transceiver, wherein determining the power level at the second transceiver includes the first transceiver requesting the power level at the second transceiver;

determining whether the power level at the second transceiver is at an acceptable level over the pathway; and adjusting a power level at the first transceiver in response to determining whether the power at the second transceiver is at the acceptable level.

2. The method of claim 1, wherein establishing the pathway includes establishing the pathway with the smallest amount of power acceptable.

3. The method of claim 1, wherein determining whether the power level at the second transceiver is at an acceptable level includes analyzing for distortion at the second transceiver.

4. The method of claim 3, wherein adjusting the power level at the first transceiver includes adjusting the power level of the first transceiver to establish a politeness cutback.

5. The method of claim 4, wherein adjusting the power level at the first transceiver in response to acknowledgment from the second transceiver includes adjusting the power level to establish an off-hook cutback level.

6. The method of claim 5, wherein the politeness cutback level and the off-hook cutback level are determined substantially simultaneously.

7. The method of claim 3, wherein adjusting a power level at the first transceiver includes increasing the power level at the first transceiver linearly until the power level at the second transceiver reaches an acceptable power level.

8. The method of claim 7, wherein increasing the power level at the first transceiver linearly until the power level at the second transceiver reaches an acceptable power level includes increasing the power level linearly until the power level reaches the highest acceptable power level.

9. The method of claim 3, wherein adjusting the power level at the first transceiver includes increasing the power level at the first transceiver logarithmically until the power level at the second transceiver is at an acceptable power level.

10. The method of claim 3, wherein adjusting the power level at the first transceiver includes increasing the power level at the first transceiver using a binary algorithm until the power level at the second transceiver is at an acceptable power level.

11. An apparatus for communicating with a transceiver, comprising:

a first logic being capable of establishing a pathway with the transceiver; and a second logic being capable of:
  determining a power level at the transceiver;
  determining whether the power level at the transceiver is at an acceptable level over the pathway; and
  adjusting a power level of the apparatus in response to determining whether the power at the transceiver is at the acceptable level.

12. The apparatus of claim 11, further including a third logic being capable of transmitting and receiving data with the transceiver.

13. The apparatus of claim 11, wherein the first logic is capable of establishing the pathway with the smallest amount of power acceptable.

14. The apparatus of claim 11, wherein the second logic being capable of determining the power level at the transceiver includes the second logic being capable of requesting the power level at the transceiver.

15. The apparatus of claim 14, wherein the second logic being capable of determining whether the power level at the transceiver is at an acceptable level includes the second logic being capable of analyzing for distortion at the transceiver.

16. The apparatus of claim 15, wherein the second logic being capable of adjusting the power level at the transceiver includes the second logic being capable of adjusting the power level of the transceiver to establish a politeness cutback.

17. The apparatus of claim 15, wherein the second logic being capable of adjusting the power level at the transceiver includes the second logic being capable of adjusting the power level to establish an off-hook cutback level.

18. The apparatus of claim 17, wherein the second logic being capable of adjusting the power level at the transceiver includes the second logic being capable of determining the politeness cutback level and the off-hook cutback level substantially simultaneously.

19. The apparatus of claim 15, wherein the second logic being capable of adjusting the power level includes the second logic being capable of increasing the power level of the apparatus linearly until the power level at the transceiver reaches an acceptable power level.

20. The apparatus of claim 19, wherein the second logic being capable of increasing the power level of the transceiver linearly includes increasing the power level of the apparatus until the power level reaches a highest acceptable power level.

21. The apparatus of claim 15, wherein the second logic being capable of adjusting the power level includes the second logic being capable of increasing the power level of the apparatus logarithmically until the power level at the transceiver is at an acceptable power level.

22. The apparatus of claim 15, wherein the second logic being capable of adjusting the power level includes the second logic being capable of increasing the power level of the apparatus using a binary algorithm until the power level at the transceiver is at an acceptable power level.

23. A system, comprising:
  a first transceiver; and
  a second transceiver, comprising:
    a first logic being capable of establishing a pathway with the first transceiver; and
    a second logic being capable of:
      determining a power level at the first transceiver;
      determining whether the power level at the first transceiver is at an acceptable level over the pathway; and
      adjusting a power level of the second transceiver in response to determining whether the power at the first transceiver is at the acceptable level.

24. The system of claim 23, wherein the first transceiver is a DSL modem.

25. The system of claim 24, wherein the second transceiver is a DSL modem.

26. The system of claim 23, wherein the second logic being capable of determining the power level at the first transceiver includes the second logic being capable of requesting the power level at the first transceiver.

27. The system of claim 26, wherein the second logic being capable of determining whether the power level at the first transceiver is at an acceptable level includes the second logic being capable of analyzing for distortion at the first transceiver.

28. The system of claim 27, wherein the second logic being capable of adjusting the power level at the first transceiver includes the second logic being capable of adjusting the power level of the first transceiver to establish a politeness cutback.

29. The system of claim 27, wherein the second logic being capable of adjusting the power level at the first transceiver includes the second logic being capable of adjusting the power level to establish an off-hook cutback level.

30. The system of claim 29, wherein the second logic being capable of determining the politeness cutback level and the off-hook cutback level substantially simultaneously.

31. The system of claim 27, wherein the second logic being capable of adjusting the power level includes the second logic being capable of increasing the power level of the second transceiver linearly until the power level at the first transceiver reaches an acceptable power level.

32. The system of claim 31, wherein the second logic being capable of increasing the power level of the second transceiver linearly includes increasing the power level of the second transceiver until the power level reaches a highest acceptable power level.

33. An apparatus, comprising:
  means for establishing a pathway from a first transceiver to a second transceiver;
  means for determining a power level at the second transceiver, wherein determining the power level at the second transceiver includes the first transceiver requesting the power level at the second transceiver;
  means for determining whether the power level at the second transceiver is at an acceptable level over the pathway; and
  means for adjusting a power level at the first transceiver in response to determining whether the power at the second transceiver is at the acceptable level.

34. A method, comprising:
  establishing a connection from a first transceiver to a second transceiver;
  determining, at the first transceiver, a power level at the second transceiver;
  determining, at the first transceiver, whether the power level at the second transceiver is at an acceptable level; and
  adjusting a power level at the first transceiver in response to determining whether the power at the second transceiver is at the acceptable level.

35. The method of claim 34, wherein determining the power level at the second transceiver comprises the first transceiver requesting the power level at the second transceiver.

36. The method of claim 34, wherein establishing the pathway from the first transceiver to the second transceiver comprises establishing the pathway with the smallest amount of power acceptable.

37. The method of claim 34, wherein determining, at the first transceiver, whether the power level at the second transceiver is at an acceptable level comprises analyzing for distortion at the second transceiver.

38. The method of claim 34, wherein adjusting the power level at the first transceiver comprises adjusting the power level of the first transceiver to establish a politeness cutback level.

39. The method of claim 34, wherein adjusting the power level at the first transceiver comprises adjusting the power level of the first transceiver to establish an off-hook cutback level.

* * * * *